United States Patent [19]

Rizzo

[11] 3,825,346
[45] July 23, 1974

[54] INTERFEROMETERS FOR FLUID FLOW MEASUREMENTS

[75] Inventor: Joseph Edward Rizzo, Hythe, Nr. Southampton, England

[73] Assignee: The Secretary of State for Defence in Her Brittanic Majesty's Government of the United Kingdom of Great Britain and Northern Ireland, London, England

[22] Filed: Apr. 16, 1973

[21] Appl. No.: 351,759

[30] Foreign Application Priority Data
Apr. 17, 1972   Great Britain .................... 17562/72

[52] U.S. Cl. .................... 356/106, 356/113, 356/28
[51] Int. Cl. ............................................ G01b 9/02
[58] Field of Search ............ 356/28, 106, 107, 108, 356/109, 110, 111, 112, 113

[56]   References Cited
UNITED STATES PATENTS
3,532,427  10/1970  Paine ..................................... 356/28
3,732,014   5/1973  Uzgiris ................................. 356/103

Primary Examiner—Ronald L. Wibert
Assistant Examiner—Conrad Clark

[57] ABSTRACT

An interferometer for detecting the velocity of small particles in a fluid includes relatively static means comprising a source of coherent radiation and a beam splitter means mounted in a fixed relationship for directing beams of coherent radiation from the source along two predetermined paths comprising a test path which will pass through the fluid under test and a reference path, and a scattering means mounted in the reference path for scattering the radiation in that path into a plurality of angles; and rotatable means, comprising a structure pivotably connected to said static means and rotatable about an axis which passes through the intersection of the reference path with the scattering means and through the intersection of the test path with the fluid under test, and optical components mounted on the said structure comprising recombination means for interferingly recombining radiation scattered into identical angles from both paths and thereby forming interference fringes which indicate the local velocity of the fluid under test.

4 Claims, 5 Drawing Figures 3,825,346

INTERFEROMETERS FOR FLUID FLOW MEASUREMENTS

BACKGROUND OF THE INVENTION

The present invention relates to fluid flow measuring apparatus and in particular to apparatus for measuring the velocities of particles carried in fluid flow.

Known instruments for the measurement of velocities of particles carried in fluid flow make use of the Doppler effect by which the frequency of radiation scattered by the particles is altered with respect to the frequency of the incident radiation in a known manner dependent on the velocity of the particles. Some of the known instruments measure these frequency changes by using interferometer techniques. For example, one instrument which has been used in several modified forms is the Mach-Zehnder interferometer which has been used to study the gas pressure in the region of projectiles and aircraft. In this type of interferometer, fringes are formed by the interference on recombination of a split beam of light, one beam of which has passed through the gas concerned and the other having traversed an equal path length but not in the gas. The chief advantage of the Mach-Zehnder interferometer over other forms of interferometer is its ability to relate the fringes formed to particle velocities occurring in a chosen plane within the gas so that gas flow at various planes within a large volume of the gas can be observed sequentially. One such instrument which is described in U.S. Pat. No. 3,532,427 requires a beam splitting prism and several lenses which must be of very high optical quality in order to achieve distinct interferences fringes.

It is an object of the present invention to provide an improved interferometer apparatus, capable of providing measurements of the fluid flow within a relatively very small volume of the fluid under test, without obstructing or interfering with the flow, and convenient for making measurements at various angles without requiring critical readjustment.

SUMMARY OF THE INVENTION

According to the present invention an interferometer includes relatively static means comprising a source of coherent radiation and a beam splitter means mounted in a fixed relationship for directing beams of coherent radiation from the source along two predetermined paths comprising a test path, which will pass through the fluid under test, and a reference path. A scattering means is mounted in the reference path for scattering the radiation in that path into a plurality of angles. The interferometer further includes rotatable means, comprising a structure pivotably connected to said static means and rotatable about an axis which passes through the intersection of the reference path with the scattering means and through the intersection of the test path with the fluid under test, and optical components mounted on the said structure comprising recombination means for interferingly recombining radiation scattered into a chosen predetermined angle from both paths, whereby interference fringes may be formed which indicate the motion of a part of the fluid under test. The scattering means and the particles in the fluid under test cause the scattered radiation to spread out from the said axis with spherical wavefronts, and the recombination means recombines portions of the scattered radiation to form interference fringes. Because the scattered radiation spreads out with spherical wavefronts from points on the axis of rotation of the rotatable structure, and the components mounted on the structure remain in a fixed relationship, the conditions for the formation of the fringes are maintained during rotation of the structure. The arrangement can then be very conveniently used to study radiation at various angles without consequential readjustments or calibration corrections.

The interferometer preferably further includes detection means for detecting the recombined radiation and, connected to such means, frequency discrimination means, whereby a signal whose magnitude is dependent on the frequency of the radiation detected may be produced. The interferometer may include a plurality of recombination means each of which is located so as to recombine radiation scattered by the fluid and by the scattering means into a separate one of a corresponding plurality of angles so that a more complete measurement of the behaviour of the fluid may be obtained instantaneously. The signal produced by the discriminator means may be fed to a magnetic tape recorder and the information contained on the tape analyzed by a computer. A tracking filter which automatically tracks the instantaneous frequency of the radiation currently being detected may also be used in conjunction with the detection means to improve signal-to-noise ratios in a known manner.

In some applications of the interferometer the test path is arranged to intercept a fluid to be studied which will inherently scatter the radiation travelling along that path because of particles travelling with it. However, in other applications, for instance in the study of air moving in pipes, scattering centers must be deliberately introduced into the fluid. In this latter case means for injecting into the fluid a scattering means which will accurately follow any motion of that fluid must be provided. For example, water droplets may be injected into moving gas and these droplets, provided they are of sufficiently small size and thus move correspondingly with the gas, carry naturally occurring particles which will provide scattering centers for the radiation travelling through the gas.

BRIEF DESCRIPTION OF THE DRAWINGS

In order for the reader to appreciate the novel features of the present invention in comparison with the conventional Mach-Zehnder interferometer, the latter will be briefly described with reference to FIG. 1 of the accompanying drawings and two embodiments of the invention will be described by way of example only and with reference to the further accompanying drawings of which.

DESCRIPTION OF PREFERRED EMBODIMENTS

Figure 1:
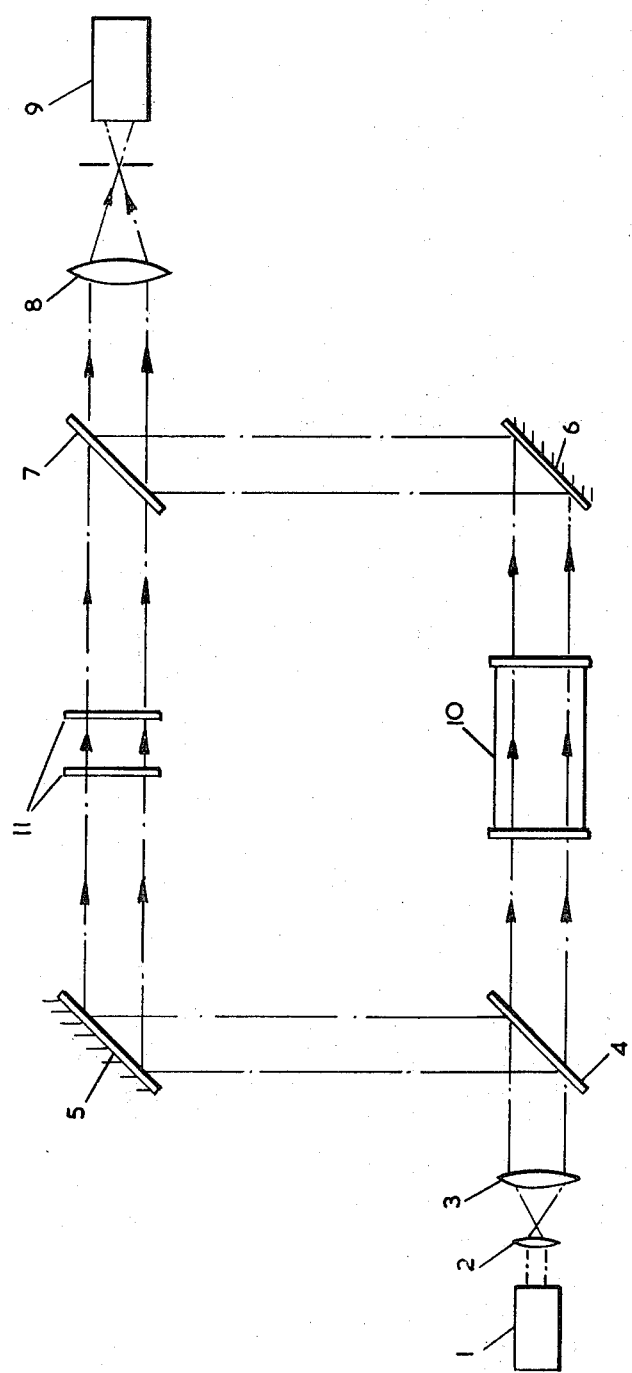

FIG. 1 shows the optical system of the prior art

Mach-Zehnder interferometer. A laser 1 co-operates with the lenses 2 and 3 to provide a moderately extended source of monochromatic radiation which is incident at an angle of 45° on the semi-silvered plate 4 and there split into two beams, one being reflected by the plate 4 and the other being refracted through it. The two beams are widely separated and travel approximately equal length paths via mirrors 5 and 6 respectively to the semi-silvered plate 7. The two paths may be in the same horizontal plane, in which case FIG. 1 is a plan view of the apparatus, or they may be in the same vertical plane, in which case FIG. 1 is a side view. The choice of the plane in which the paths are to be located is dictated by the application to which the interferometer is to be put. At the plate 7 one beam is reflected and the other refracted so that they recombine interferingly. The combined radiation is then focussed by the lens 8 to form fringes which are observed by the detector 9. One of the beams is made to pass through a container 10 containing a gas the flow of which is to be studied, for example the air in a wind tunnel, while the other beam can be passed through a pair of plates 11 which compensate for the effect of the windows in the sides of the container 10 although this is not always necessary when the source of radiation is a laser. Because the paths 4, 6, 7 and 4, 5, 7 are of equal length, a suitable adjustment of the mirrors 5 and/or 6 gives localized fringes which are localized in a chosen plane in the container 10. Variations in gas density in the plane chosen for observation will then be detected by corresponding movement of the fringes observed by the detector 9. The way in which the movement of the fringes is related to the changes in gas pressure is well known and for further details on these relationships the reader is referred to any text book on Physical Optics, for instance "Geometrical and Physical Optics" by R S Longhurst, published by Longmans.

Figure 2:
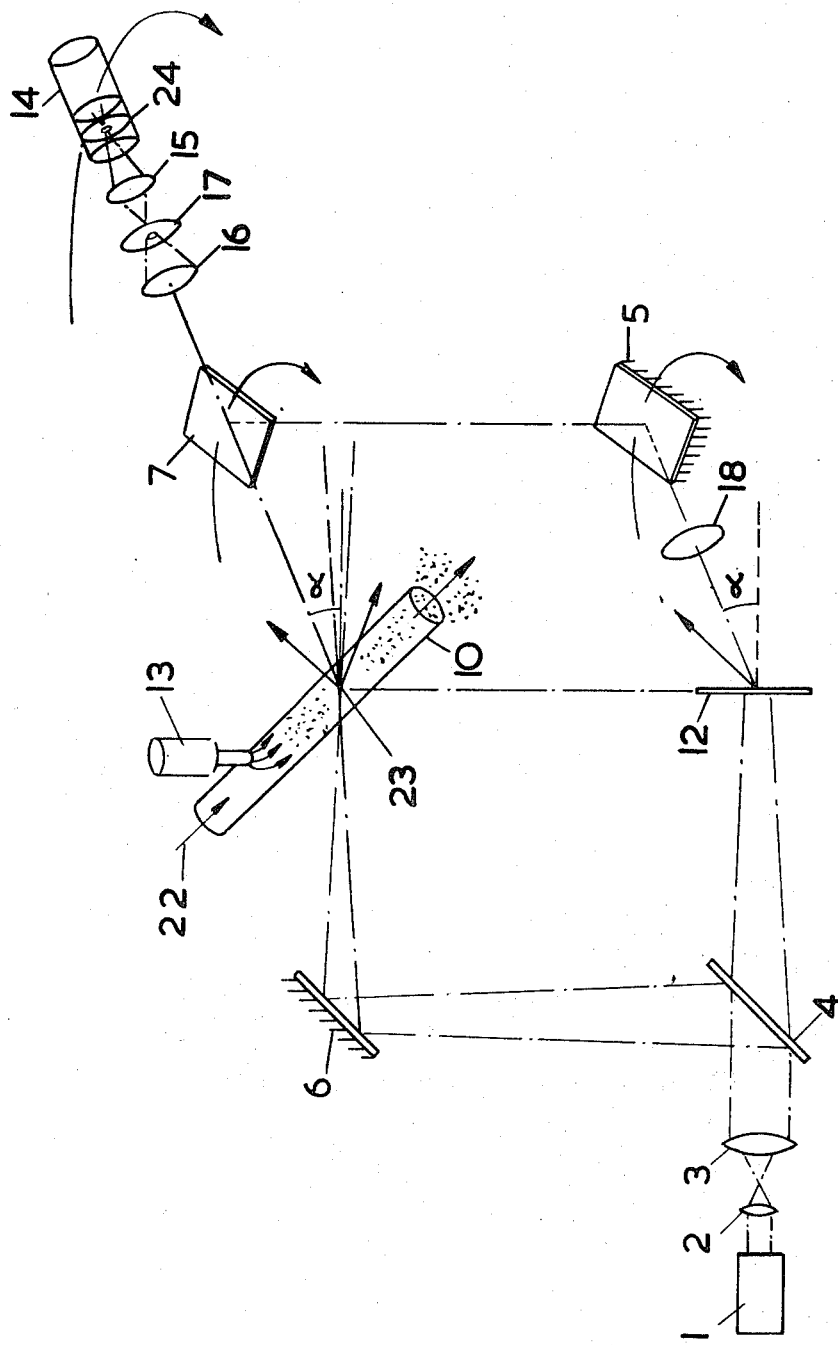
FIG. 2 shows a schematic drawing of the optical system of an interferometer constructed in accordance with the present invention.
Figure 5:
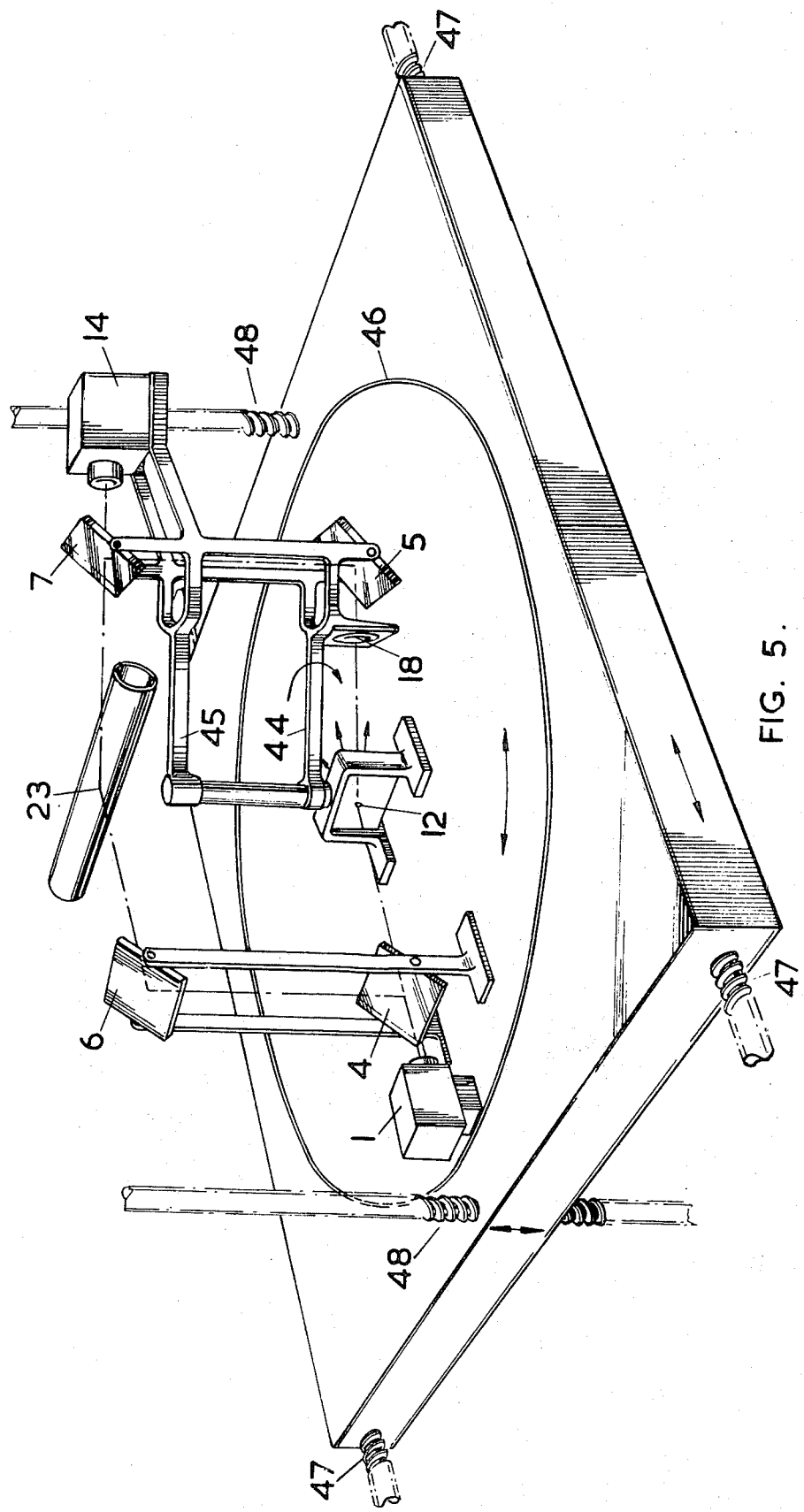

The interferometer shown in FIG. 2 and FIG. 5 is an example of the present invention. Features common to the Mach-Zehnder interferometer shown in FIG. 1 are given the same reference numbers. The beam of radiation travelling from the semi-silvered plate 4 towards the mirror 5 is scattered by a scattering device 12, for example a grease spot on a plate of glass. This beam will be referred to hereinafter as the reference beam, while the beam travelling via the mirror 6 will be referred to as the test beam. The mirror 5 is rotatably mounted about a vertical axis through the scattering device 12 on an arm 44 so that radiation scattered into any predetermined chosen angle may be directed towards the semi-silvered plate 7. The plate 7 is mounted on a similar arm 45 to that of the mirror 5 and rotates correspondingly about the same vertical axis which also passes through a point of focus 23 of the test beam of radiation from the mirror 6. The plate 7 will therefore receive radiation scattered into an identical angle with respect to the test beam's unscattered direction as the chosen scattering angle of the reference beam selected by the mirror 5.

A photo multiplier tube 14 is positioned to received the recombined scattered radiation via the lenses 15 and 16 and the aperture 17. This detection part of the apparatus 14, 15, 16 and 17 is carried on the same arm as the plate 7 so that it receives radiation from the chosen scattering angle. The whole interferometer is rotatably mounted on a turntable 46 about the same vertical axis which passes through the focal point 23 which enables it to be moved in azimuth so that the test beam intercepts the air 22 in the container 10 at any desired yaw angle between the main direction of the air flow and the incoming laser beam. This rotation about a single axis allows both yaw and scattering angles to be changed without disturbing the alignment of the instrument. Adjustment of the two mirrors 5 and 6 and the two beam splitters 4 and 7 is critical. They are carried in holders (not shown) which are adjusted by mircometer drives (not shown) in two directions of rotation. The positions of the other lenses and the apertures are less sensitive and they are carried on optical traverses (not shown).

The whole interferometer apparatus is also mounted on horizontal and vertical screw driven ball bearing tracks 47 and 48 which enable it to be moved in two mutually perpendicular directions with respect to the container 10 so that the focal point 23 may be made to intercept the air 22 at any desired point within the pipe 10.

The instrument is carried on a table (not shown) which rests on a plastic air bag packing material to minimize vibration reaching the instrument. The supporting structure (not shown) of the interferometer is constructed of welded aluminum box beams, and is provided with a fixed arm (not shown) to terminate the unscattered main beam. In this example the container 10 is a pipe through which the air 22 is moving. To study the flow of the air 22 within the pipe 10, a water mist injector 13 is provided at one end of the pipe 10. In order to provide suitable non contaminating droplets for use with a variety of existing wind tunnels and tubes, a commercial "norgren" oil mist generator can be converted to produce a water mist by decreasing the size of the internal water jet and increasing the plenum chamber by putting a spacer between the body and cap and providing a large exit orifice.

Optical radiation scattered from the scattering device 12 and from the moving air 22 in the pipe 10 propagates in spherical wavefronts. While the total lengths of the two optical paths are equal, the distance from the scattering centers to the photo multiplier tube 14 are not. A lens 18 is therefore positioned between the scattering device 12 and the mirror 5 to make the curvature of wavefronts of the test beam scattered from particles within the pipe 10 the same as the curvature of the wavefronts of the reference beam at the semi-silvered recombination plate 7.

In operation, the chosen scattered wavefronts from both beams are recombined by the semi-silvered plate 7, and are focussed by the lens 16 through the aperture in the screen 17 which obstructs most of any stray light not coming from the test beam through the region of the focal point 23. The wavefronts are then partially focussed by the second lens 15 through a second and larger aperture in the photo multiplier tube 14 which obstructs more of any remaining stray light and allows the strongest signal region to be selected. The photo multiplier 14 is provided with a neutral density filter 24 which protects it from room light.

Figure 3:
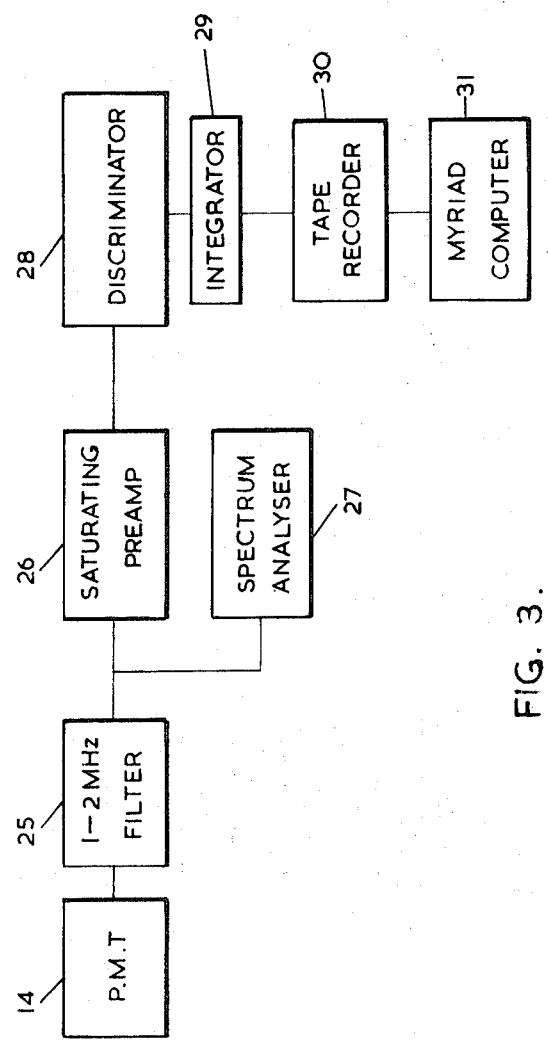
FIG. 3 shows a block circuit diagram of processing electronics to be used in conjunction with the interferometer of FIG. 2.

Before use the instrument is optically aligned. Alignment is done visually. With no air flow present in the tube 10 a second scattering plate (not shown) is placed at the focal point 23 of the test beam so that it and the other scattering device 12 are both on the vertical rotation axis of the instrument. A 45° mirror (not shown) is placed after the aperture 17 and the combined scattered beams expanded and projected onto a screen. Circular fringes moving due to vibration and density changes, are then visible against the mottled pattern formed by the combined beams. These are centered by moving the negative lens 18 and the reference beam mirror 5, and expanded to fill the field by moving the lens 18 along the light beam. Final adjustment is done by removing the second scattering plate and 45° mirror. With the electronic and gas flow systems and injection systems running, the signal as seen on a frequency spectrum analyser shown in FIG. 3 is brought to a maximum by suitable adjustment of the reference beam mirror 5. Clearly similar techniques may be used for setting up other embodiments of the invention. While some alignment drifts probably due to thermal causes have been noted after half an hour or so of operation, the instrument is relatively insensitive to vibrations.

It should be noted that the main lenses of the apparatus are outside the interferometer system, that is to say they are located either before the beam splitting or after the beam recombination, and hence their quality is not unduly critical. The lens 18 does have to be of better quality but it does not need to be very strong. It should also be noted that the reference beam and the test beam have optical paths of equal length. In consequence of these features, clear and distinct fringes can be obtained with radiation from a multimode laser, and it is not necessary to use a single mode laser for the source of coherent radiation 1. Because the light scattered from the test beam is compared with light scattered from the reference beam at an equal angle, the two beams of radiation compared will have comparable amplitudes and it will not be necessary to adjust the attenuation of the reference beam when the angle is altered. This arrangement allows the yaw angle and scattering angle to be conveniently adjusted as required without necessitating consequential adjustments.

FIG. 3 shows the electronic instrumentation used in association with the interferometer shown in FIG. 2. A S20 cathode photo multiplier or photo diode 14 is used as a detector. The photo multiplier 14 is connected via a 1 to 2 MHz band-pass filter 25 to a spectrum analyser 27 and via a saturating pre-amplifier 26 to a frequency discriminator 28. The output of the discriminator 28 is recorded on a tape recorder 30 after integration in an integrator 29. The read facility of the tape recorder 30 is directly connected to a computer 31.

In operation the photo multiplier tube 14 will produce an output signal whose frequency is directly proportional to the Doppler shift of the received radiation from the test beam with respect to the frequency of the received radiation from the reference beam. This Doppler shift is dependent on the velocity of the air flow, the angle of incidence of the test beam with respect to the air flow direction and the chosen scattering angle. The band width of the filter 25 is wide enough to allow for all expected Doppler shifts of frequency of the received signals. In turbulent air flow conditions the Doppler shift of the frequency of the received signals will fluctuate rapidly. The spectrum analyser 27 provides a simple statistical frequency analysis of the air flow velocities and incicates the extent of turbulence in the pipe. The saturating pre-amplifier 26 limits the amplitude excursions of the received signals due to beating of the component frequencies in the statistical distribution, and the frequency discriminator 28 provides a voltage output signal which is proportional to the instantaneous frequency of the signal received at its input from the saturating preamplifier 26. The output of the discriminator 28 is a series of equal width pulses of magnitude proportional to the frequency of the signal at the input of the discriminator 28. The integrator circuit 29, which is a 2.5 KHz low-pass filter, integrates a predetermined number of these pulses and applies the resulting direct-current signal to the tape recorder 30. The resulting voltage versus time signal recorded by the tape recorder 30 therefore provides data for analysis by the computer 31 in the form of the time histories of the frequency changes or in other words the time history of changes in the velocity components of the water droplets carried in the air flow. By adjusting the instrument so that the focal point 23 of FIG. 2 is moved to different points within the pipe and different scattering angles or yaw angles are chosen for each such point, the interferometer can therefore provide an accurate measurement of the extent and variation of turbulence in the air flow in the pipe.

Figure 4:
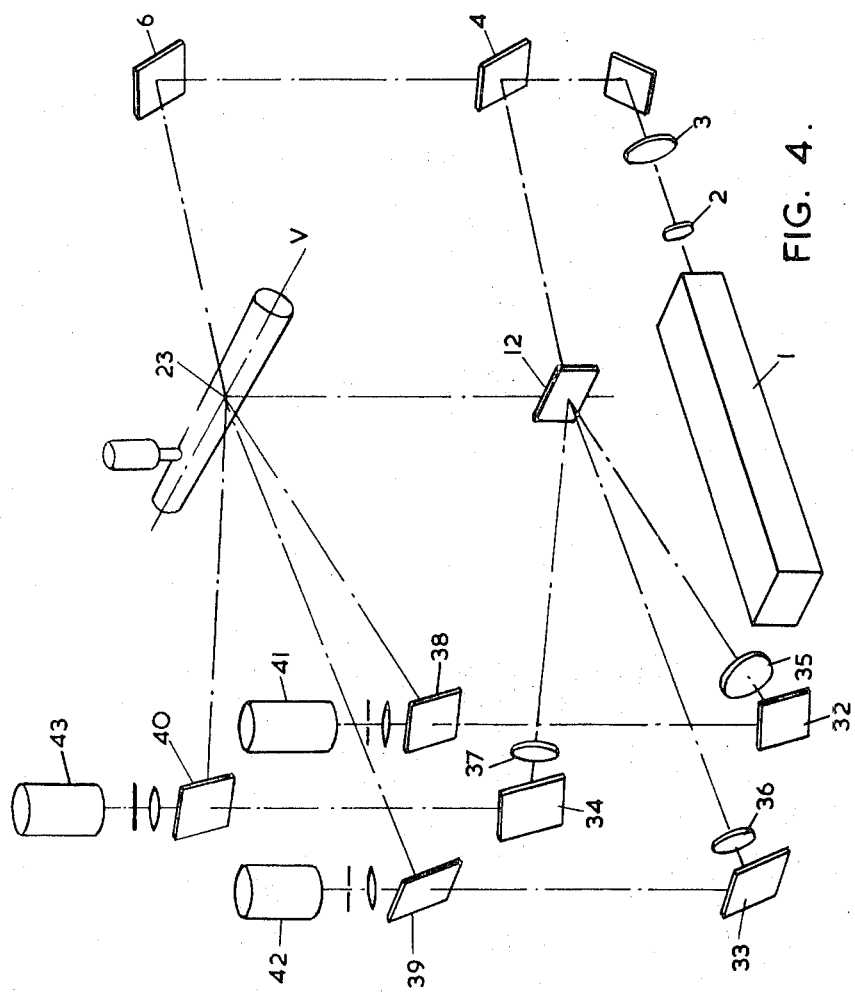
FIG. 4 shows a modified form of the interferometer shown in FIG. 2 and, FIG. 5 shows a perspective sketch of the mechanical system of the interferometer.

In FIG. 4 a modified form of the interferometer of FIG. 2 is shown in which the velocity components of water droplets carried in the air flow can be observed for a number of different scattering directions simultaneously. The arrangement is generally similar to that shown in FIG. 2 except that the scattering device 12 scatters the laser light in the directions of three mirrors 32, 33 and 34 via lenses 35, 36 and 37 respectively. In other words there are now three reference beams instead of just one. Each reference beam is recombined at a semi-silvered plate with an associated test beam scattered into the same angle as the reference beam. Thus the reference beam reflected from the mirror 32 is recombined with a corresponding test beam by a semi-silvered plate 38, the reference beam reflected by the mirror 33 is recombined with a corresponding test beam by the semi-silvered plate 39, and the reference beam reflected by the mirror 34 is recombined with a corresponding test beam by the semi-silvered plate 40. The three combined beams are then detected by photo multiplier tubes 41, 42 and 43, each of which is associated with an electronic circuit such as that shown in FIG. 3. The advantage of this arrangement compared with that shown in FIG. 2 is that a three-dimensional picture of the behaviour of the air flowing through the pipe may be obtained instantaneously by suitably analyzing the output of each of the photo multipliers 41, 42 and 43.

Many variations in the embodiments described will now suggest themselves to persons skilled in the art. For example the instrument could readily be adapted to examine the radiation scattered in a backwards direction by the air flow and by the scattering device 12, and this has advantages in certain applications. For instance if it is desired to examine the pressure or velocity field of the air at the intake to a jet engine it would be physically impracticable to use forward scattered radiation because the siting of the various mirrors and detectors within the maze of compressor blades of the engine would not be possible. By using back scattered radiation the mirrors and detectors may be located outside the engine.

There is virtually no size limitation to the instrument which can be made as small or as large as the application demands. Nor is there any need for restriction of the laser modes.

Very low flow rates may be measured with the instrument which has virtually no low-frequency limit. However velocities above or about the order of 100 metres per second give rise to very high Doppler shift frequencies of the signals from the photo multiplier which are not convenient to process and at certain geometrical configurations of the apparatus may also be beyond the capabilities of the photo multiplier. The high frequency response of the instrument can be improved by using a voltage scanning Fabry-Perot interferometer before the photo multiplier.

The instrument has applications in measuring and observing turbulence associated with air flow over aircraft parts where for instance it is desired to know how often turbulence of a particular type occurs during chosen experiments. This instrument provides a time analysis of the velocity components of the turbulent air flow.

In another application the gas flows associated with the exhaust of a rocket motor may be analyzed and, in this case, no particles for scattering purposes need be injected in the exhaust since the materials carried in the exhaust provide scattering centers themselves. Known instruments for measuring and observing flow do not readily provide analysis of such short duration flows as are associated with rocket motor exhaust streams but the instrument according to the invention is particularly applicable to such problems.

The interferometer is not restricted to measuring air flow but may be used to measure flow behaviour of any fluid transparent to the radiation used. Nor is the interferometer restricted to employ only optical radiation; any monochromatic radiation scattered by the fluid or by suitably injected particles carried by the fluid may be used provided the doppler frequency shifts given to it are such as to be resolvable by known detectors of that radiation.

Interferometers according to the invention as described above can be used to measure high level turbulence in fluid flows; to indicate the time history of the velocities of particles carried by the flow; and to measure relatively large flow rates where forward scattering of the radiation can be used. They can be made to respond to a wide frequency range corresponding to a wide range of particle velocities and they can be constructed so that only relatively simple adjustments are required in order to carry out a range of measurements.

I claim:

1. An interferometer for detecting the velocity of small particles in a fluid, which includes relatively static means comprising a source of coherent radiation and a beam splitter means mounted in a fixed relationship to one another for directing beams of coherent radiation from the said source along two predetermined paths one of which comprises a reference path and the other of which comprises a test path which will pass through the fluid under test, and a scattering means mounted in the reference path for scattering the radiation in that path into a plurality of angles; rotatable means comprising a structure pivotably connected to said relatively static means and rotatable about an axis which passes through the intersection of the reference path with the scattering means and through the intersection of the test path with the fluid under test, and optical components mounted on said structure and comprising recombination means for interferingly recombining radiation scattered through equal angles from both of said paths thereby to form interference fringes which indicate the local velocity of the fluid under test.

2. The interferometer of claim 1 further comprising detection means mounted in fixed relationship to said recombination means for detecting the recombined radiation, and frequency discrimination means connected to the said detection means for producing a signal the magnitude of which is proportional to the frequency difference between the radiation received from said test path and the radiation received from said reference path.

3. An interferometer as claimed in claim 1 wherein the test path and the reference path are of substantially equal optical length.

4. The interferometer of claim 1 wherein said interferometer is mounted on a rotatable turntable having an axis of rotation that is colinear with the said axis which passes through said intersections.

* * * * *